United States Patent
She et al.

(10) Patent No.: US 11,554,642 B2
(45) Date of Patent: Jan. 17, 2023

(54) VOLTAGE CONVERSION SYSTEM FOR TRANSPORT REFRIGERATION SYSTEM

(71) Applicant: Carrier Corporation, Palm Beach Gardens, FL (US)

(72) Inventors: Xu She, Cohoes, NY (US); XuQiang Liao, Manlius, NY (US); Jaegue Shin, New Britain, CT (US); Ismail Agirman, Southington, CT (US); HanJong Kim, Avon, CT (US); David Ginsberg, Granby, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 125 days.

(21) Appl. No.: 17/125,220

(22) Filed: Dec. 17, 2020

(65) Prior Publication Data
US 2021/0331560 A1    Oct. 28, 2021

Related U.S. Application Data (60) Provisional application No. 63/013,787, filed on Apr. 22, 2020.

(51) Int. Cl.
*H02M 7/537*    (2006.01)
*B60H 1/32*     (2006.01)

(52) U.S. Cl.
CPC .......... *B60H 1/3232* (2013.01); *H02M 7/537* (2013.01)

(58) Field of Classification Search
CPC .. H02J 2207/20; H02J 7/0063; H02M 1/0064; H02M 7/537; H02M 3/1586; F25D 19/003; B60H 1/3232
See application file for complete search history.

(56) References Cited

U.S. PATENT DOCUMENTS

| | | | |
|---|---|---|---|
| 3,694,726 A | 9/1972 | Cielo et al. |
| 5,488,279 A | 1/1996 | Kawamoto et al. |
| 7,599,196 B2 | 10/2009 | Alexander |
| 8,074,753 B2 | 12/2011 | Tahara et al. |
| 8,680,795 B2 | 3/2014 | Tang et al. |

(Continued)

FOREIGN PATENT DOCUMENTS

| | | |
|---|---|---|
| CN | 107284271 A | 10/2017 |
| CN | 107979321 A | 5/2018 |

(Continued)

OTHER PUBLICATIONS

European Search Report for Application No. 20211048.2; dated Jun. 7, 2021; 8 Pages.

(Continued)

*Primary Examiner* — Jared Fureman
*Assistant Examiner* — Esayas G Yeshaw
(74) *Attorney, Agent, or Firm* — Cantor Colburn LLP (57) ABSTRACT

A voltage conversion system includes an energy storage device; a power conversion unit connected to the energy storage device, the power conversion unit comprising: an inductor, the inductor comprising a number of coils that are non-coupled or weakly coupled, with a coupling coefficient less than 0.05; a multi-phase boost stage coupled to the inductor, wherein the multiphase boost stage comprises a number of phases that equals the number of coils; an inverter coupled to the multiphase boost stage; and a load coupled to the power conversion unit.

18 Claims, 7 Drawing Sheets

(56) References Cited

U.S. PATENT DOCUMENTS

| | | | |
|---|---|---|---|
| 8,705,251 B2* | 4/2014 | Matsui | H02M 3/33584 |
| | | | 363/16 |
| 9,000,614 B2 | 4/2015 | King et al. | |
| 9,294,000 B1 | 3/2016 | Shook | |
| 9,368,977 B2 | 6/2016 | Liang et al. | |
| 9,373,438 B1 | 6/2016 | Ikriannikov et al. | |
| 9,520,741 B2 | 12/2016 | Kanakasabai | |
| 9,627,999 B2 | 4/2017 | Yamada et al. | |
| 9,701,208 B2 | 7/2017 | Berger | |
| 9,899,911 B2 | 2/2018 | Nishimoto et al. | |
| 10,074,995 B2 | 9/2018 | Smedley et al. | |
| 10,116,166 B2 | 10/2018 | Blanc | |
| 10,128,786 B2 | 11/2018 | Syed et al. | |
| 10,186,949 B1 | 1/2019 | Ferencz et al. | |
| 10,243,370 B2 | 3/2019 | Garces et al. | |
| 10,300,831 B2 | 5/2019 | Dziuba et al. | |
| 10,326,369 B2 | 6/2019 | Zhou et al. | |
| 10,396,684 B2 | 8/2019 | Mu et al. | |
| 10,480,840 B2 | 11/2019 | Truckenbrod et al. | |
| 2008/0157593 A1* | 7/2008 | Bax | B60L 50/61 |
| | | | 307/19 |
| 2014/0085953 A1* | 3/2014 | Mao | H02M 7/003 |
| | | | 363/131 |
| 2016/0329811 A1* | 11/2016 | Du | H02M 3/1584 |
| 2018/0061566 A1 | 3/2018 | Lee et al. | |
| 2018/0226817 A1 | 8/2018 | Heiling et al. | |
| 2018/0254732 A1 | 9/2018 | Smolenaers | |
| 2019/0165591 A1 | 5/2019 | Kisacikoglu et al. | |
| 2019/0366850 A1 | 12/2019 | Ge et al. | |
| 2020/0084869 A1* | 3/2020 | Jin | A61B 6/56 |
| 2020/0136521 A1* | 4/2020 | Lin | H02M 3/33569 |
| 2021/0252947 A1* | 8/2021 | She | B60H 1/00364 |

FOREIGN PATENT DOCUMENTS

| | | | |
|---|---|---|---|
| EP | 3346565 A1 | 7/2018 | |
| WO | 2011060812 A1 | 5/2011 | |
| WO | 2018189688 A1 | 10/2018 | |
| WO | 20180226389 A1 | 12/2018 | |
| WO | 2019171997 A1 | 9/2019 | |

OTHER PUBLICATIONS

Czogalla et al., "Automotive Application of Multi-Phase Coupled-Inductor DC-DC Converter," IEEE Industry Applications Society Annual Meeting, Oct. 2003, pp. 1-6.

Imaoka et al., "High-Power-Density Three-phase Interleaved Boost Converter with a Novel Coupled Inductor," IEEJ Journal of Industry Applications, vol. 4, No. 1, 2015, pp. 20-30.

Jarabicova et al., "Interleaved DC/DC Converter with Coupled Inductor—Theory and Application," American Journal of Engineering Research (AJER), vol. 7, No. 5, 2018, pp. 80-88.

Kascak et al., "Interleaved DC/DC Boost Converter with Coupled Inductors," Power Engineering and Electrical Engineering, vol. 16, No. 2, Jun. 2018, pp. 147-154.

Qin et al., "Study on Three-level DC/DC Converter with Coupled Inductors," Virginia Polytechnic Institute and State University, Sep. 6, 2016, 115 pages.

* cited by examiner

VOLTAGE CONVERSION SYSTEM FOR TRANSPORT REFRIGERATION SYSTEM

CROSS-REFERENCE TO RELATED APPLICATIONS

This application claims priority to U.S. Provisional Patent Application Ser. No. 63/013,787, filed Apr. 22, 2020, the contents of which are incorporated herein in their entirety.

BACKGROUND

The embodiments herein generally relate to transport refrigeration systems and more specifically, the energy management of such transport refrigeration systems.

Typically, cold chain distribution systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated vehicles and trailers are commonly used to transport perishable goods in a cold chain distribution system. A transport refrigeration system is mounted to the vehicles or to the trailer in operative association with a cargo space defined within the vehicles or trailer for maintaining a controlled temperature environment within the cargo space.

Conventionally, transport refrigeration systems used in connection with refrigerated vehicles and refrigerated trailers include a transportation refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated vehicles and refrigerated trailers, the compressor, and typically other components of the transportation refrigeration unit, must be powered during transit by a prime mover. In mechanically driven transport refrigeration systems the compressor is driven by the prime mover, either through a direct mechanical coupling or a belt drive, and other components, such as the condenser and evaporator fans are belt driven.

Transport refrigeration systems may also be electrically driven. In an electrically driven transport refrigeration system, components of the transportation refrigeration unit (such as a compressor) can be powered by an electric current supplied by a battery. However, due to the relatively high voltage and low power operation of a transport refrigeration application, as well as the wide battery voltage range, designing an electrical system for a transport refrigeration unit that is efficient, light weight and is compatible with different types of battery configurations is challenging.

BRIEF DESCRIPTION

According to one embodiment, a voltage conversion system includes an energy storage device; a power conversion unit connected to the energy storage device, the power conversion unit comprising: an inductor, the inductor comprising a number of coils that are non-coupled or weakly coupled, with a coupling coefficient less than 0.05; a multiphase boost stage coupled to the inductor, wherein the multiphase boost stage comprises a number of phases that equals the number of coils; an inverter coupled to the multiphase boost stage; and a load coupled to the power conversion unit.

In addition to one or more of the features described above, or as an alternative, further embodiments of the voltage conversion system may include wherein the number of coils is greater than 1.

In addition to one or more of the features described above, or as an alternative, further embodiments of the voltage conversion system may include wherein the inductor comprises at least one internal leg and a plurality of external legs and each of the number of coils is disposed on a respective external leg of the plurality of external legs.

In addition to one or more of the features described above, or as an alternative, further embodiments of the voltage conversion system may include wherein a first terminal of the energy storage device is connected to each of each of the number of coils, wherein each of the number of coils is connected to a respective input terminal of one of the number of phases of the multiphase boost stage.

In addition to one or more of the features described above, or as an alternative, further embodiments of the voltage conversion system may include wherein each respective external leg of the plurality of external legs comprises an air gap.

In addition to one or more of the features described above, or as an alternative, further embodiments of the voltage conversion system may include wherein each air gap is configured to provide an inductance at each respective external leg.

In addition to one or more of the features described above, or as an alternative, further embodiments of the voltage conversion system may include wherein each of the number of phases of the multiphase boost stage comprises a half-bridge circuit for performing DC-to-DC power conversion.

In addition to one or more of the features described above, or as an alternative, further embodiments of the voltage conversion system may include wherein each of the number of phases of the multiphase boost stage are configured to be controlled in an interleaved fashion by a controller to modify a DC voltage provided from the energy storage device to selectively deliver a preferred output DC voltages to the inverter.

In addition to one or more of the features described above, or as an alternative, further embodiments of the voltage conversion system may include wherein the inverter is configured to perform DC-to-AC power conversion to provide an AC power to the load.

According to another embodiment, a transport refrigeration system includes a controller; an energy storage device; a power conversion unit connected to the energy storage device, the power conversion unit including: an inductor, the inductor comprising a number of coils that are that are non-coupled or weakly coupled, with a coupling coefficient less than 0.05; a multiphase boost stage coupled to the inductor, wherein the multi-phase boost stage comprises a number of phases that equals the number of coils; an inverter coupled to the multiphase boost stage; and a transportation refrigeration unit coupled to the power conversion unit.

In addition to one or more of the features described above, or as an alternative, further embodiments of the transport refrigeration system may include wherein the number of coils is greater than 1.

In addition to one or more of the features described above, or as an alternative, further embodiments of the transport refrigeration system may include wherein the inductor comprises at least one internal leg and a plurality of external legs and each of the number of coils is disposed on a respective external leg of the plurality of external legs.

In addition to one or more of the features described above, or as an alternative, further embodiments of the transport refrigeration system may include wherein a first terminal of the energy storage device is connected to each of each of the number of coils, wherein each of the number of coils is connected to a respective input terminal of one of the number of phases of the multiphase boost stage.

In addition to one or more of the features described above, or as an alternative, further embodiments of the transport refrigeration system may include wherein each respective external leg of the plurality of external legs comprises an air gap.

In addition to one or more of the features described above, or as an alternative, further embodiments of the transport refrigeration system may include wherein each air gap is configured to provide an inductance at each respective external leg.

In addition to one or more of the features described above, or as an alternative, further embodiments of the transport refrigeration system may include wherein each of the number of phases of the multiphase boost stage comprises a half-bridge circuit for performing DC-to-DC power conversion.

In addition to one or more of the features described above, or as an alternative, further embodiments of the transport refrigeration system may include wherein each of the number of phases of the multiphase boost stage are configured to be controlled in an interleaved fashion by a controller to modify a DC voltage provided from the energy storage device to selectively deliver a preferred output DC voltages to the inverter.

In addition to one or more of the features described above, or as an alternative, further embodiments of the transport refrigeration system may include wherein the inverter is configured to perform DC-to-AC power conversion to provide an AC power to the transportation refrigeration unit.

Technical effects of embodiments of the present disclosure include providing a high power density, highly integrated, highly efficient and highly flexible voltage conversion system that includes integrated magnetics for reduced size, enables low current ripple for enhanced battery life, and provides a non-coupled structure for decoupled phase current shaping. Embodiments of the present disclosure provide a voltage conversion system having a compact size and can operate with different batteries having different voltages, which are benefits that are very advantageous for use in transport refrigeration systems.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
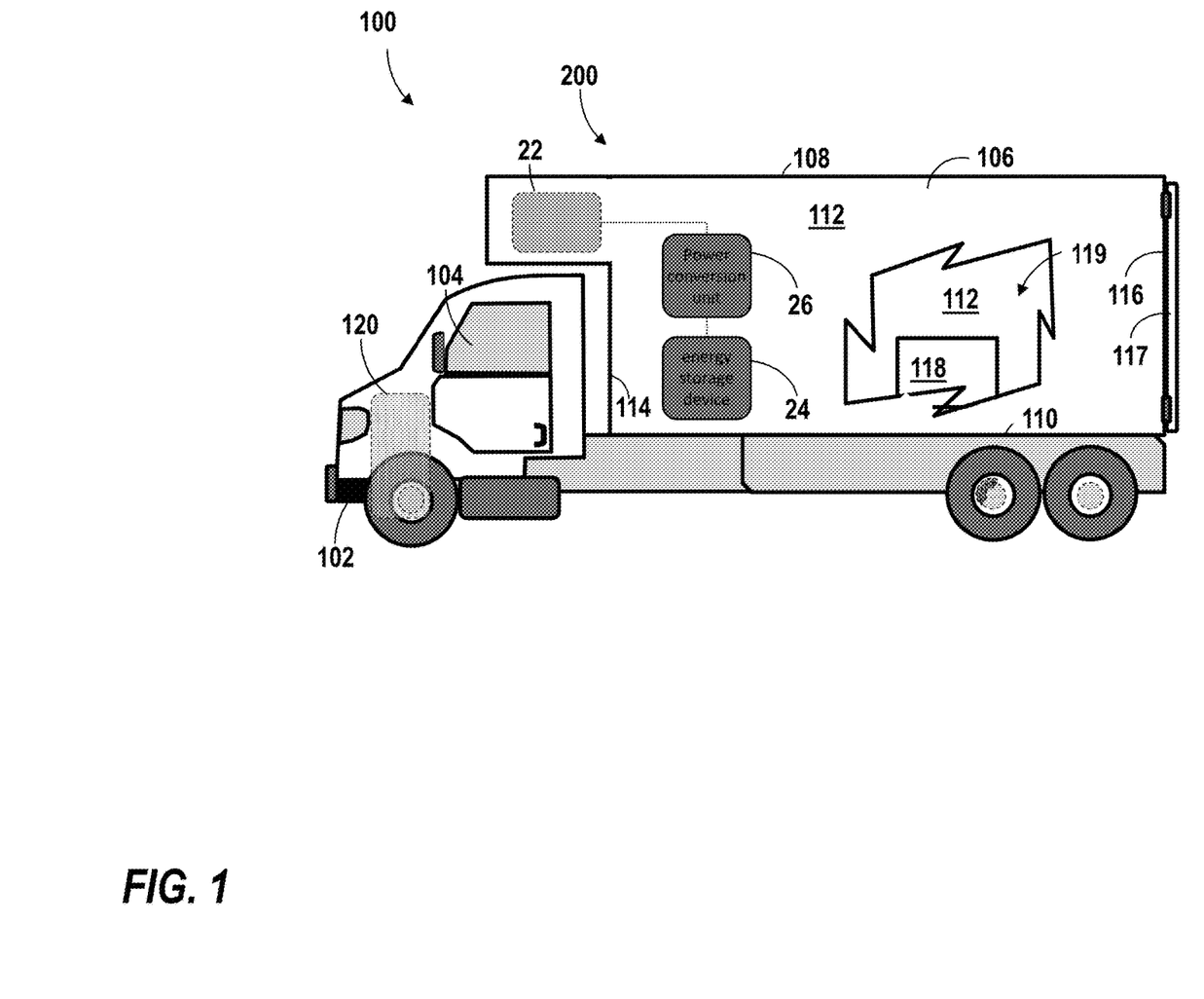
FIG. 1 is a schematic illustration of a transport refrigeration system, according to an embodiment of the present disclosure.
Figure 2:
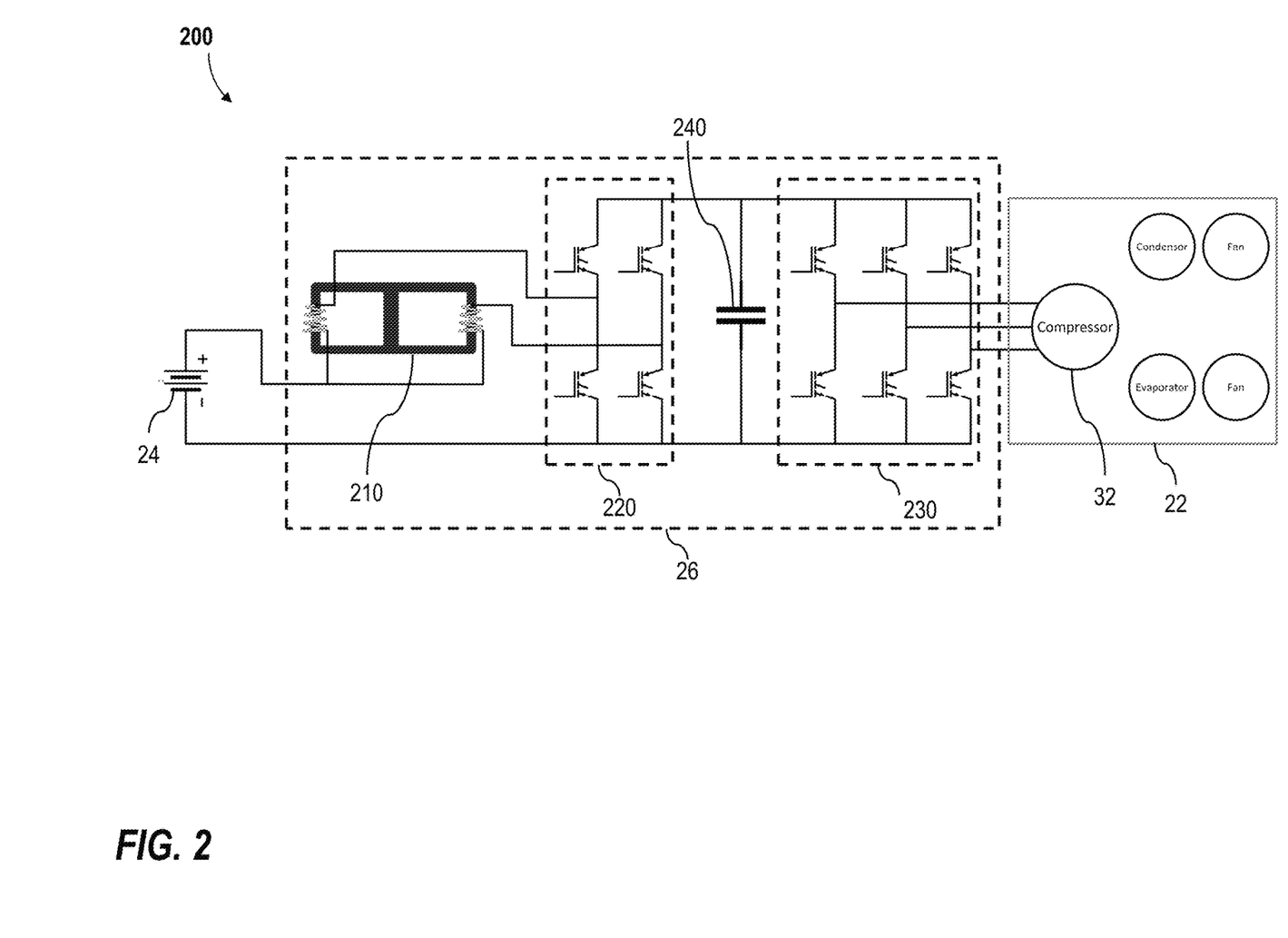
FIG. 2 is a block diagram of a power conversion unit having a two phase boost stage integrated with a transport refrigeration system of FIG. 1, according to an embodiment of the present disclosure.
Figure 5:
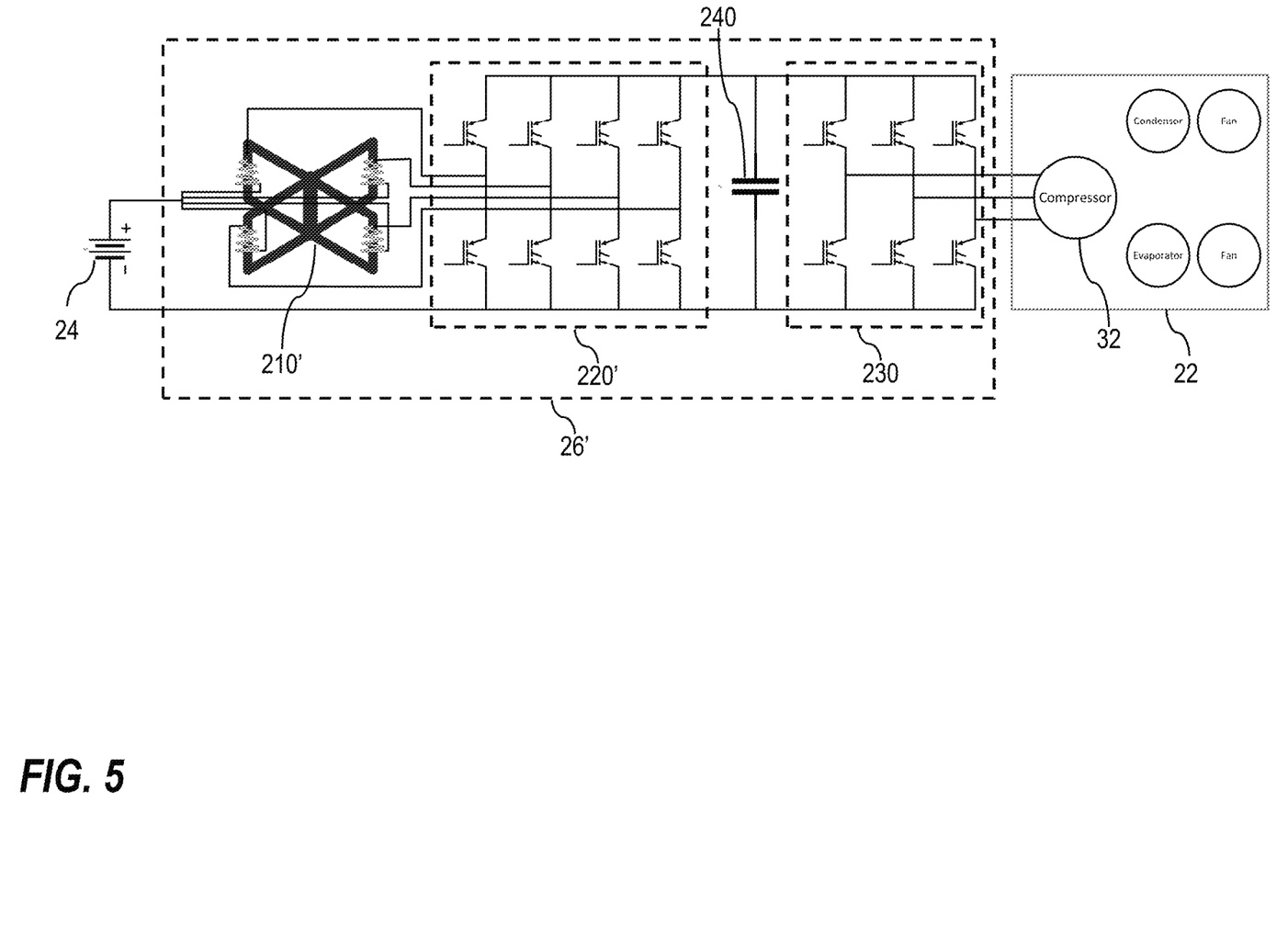
FIG. 5 is a block diagram of a power conversion unit having a multiphase boost stage integrated with a transport refrigeration system of FIG. 1, according to an embodiment of the present disclosure.

Referring to FIGS. 1, 2 and 5, various embodiments of the present disclosure are illustrated. FIG. 1 shows a schematic illustration of a transport refrigeration system 200, according to an embodiment of the present disclosure. FIG. 2 shows an exemplary power conversion unit with a two phase boost stage and inductor, whereas FIG. 5 shows an exemplary power conversion unit with a four phase boost stage and inductor.

The transport refrigeration system 200 is being illustrated as a trailer system 100, as seen in FIG. 1. The trailer system 100 includes a vehicle 102 integrally connected to a transport container 106. The vehicle 102 includes an operator's compartment or cab 104 and a propulsion motor 120 which acts as the drive system of the trailer system 100. The propulsion motor 120 is configured to power the vehicle 102. The energy source that powers the propulsion motor 120 may be at least one of compressed natural gas, liquefied natural gas, gasoline, electricity, diesel, or a combination thereof. The propulsion motor 120 may be an electric motor or a hybrid motor (e.g., a combustion engine and an electric motor). The transport container 106 is coupled to the vehicle 102. The transport container 106 may be removably coupled to the vehicle 102. The transport container 106 is a refrigerated trailer and includes a top wall 108, a directly opposed bottom wall 110, opposed side walls 112, and a front wall 114, with the front wall 114 being closest to the vehicle 102.

The transport container 106 further includes a door or doors 117 at a rear wall 116, opposite the front wall 114. The walls of the transport container 106 define a refrigerated cargo space 119. It is appreciated by those of skill in the art that embodiments described herein may be applied to a tractor-trailer refrigerated system or non-trailer refrigeration such as, for example a rigid truck, a truck having refrigerated compartment.

Typically, transport refrigeration systems 200 are used to transport and distribute perishable goods and environmentally sensitive goods (herein referred to as perishable goods 118). The perishable goods 118 may include but are not limited to fruits, vegetables, grains, beans, nuts, eggs, dairy, seed, flowers, meat, poultry, fish, ice, blood, pharmaceuticals, or any other suitable cargo requiring temperature controlled transport. The transport refrigeration system 200 includes a transportation refrigeration unit 22, an energy storage device 24 and a power conversion unit 26. The transportation refrigeration unit 22 includes a refrigerant compression device 32 for providing a heat transfer functionality and an electric motor (not shown) for driving the refrigerant compression device 32. The transportation refrigeration unit 22 is in operative association with the refrigerated cargo space 119 and is configured to provide conditioned air to the transport container 106. The transportation refrigeration unit 22 functions, under the control of a controller (not shown), to establish and regulate a desired environmental parameters, such as, for example temperature, pressure, humidity, carbon dioxide, ethylene, ozone, light exposure, vibration exposure, and other conditions in the cargo space 119, as known to one of ordinary skill in the art. In an embodiment, the transportation refrigeration unit 22 is capable of providing a desired temperature and humidity range.

Airflow is circulated into and through the refrigerated cargo space 119 of the transport container 106 by means of the transportation refrigeration unit 22. According to some embodiments, the transportation refrigeration unit 22 can include a refrigerant compression device 32 (which may be referred to simply as compressor 32), a refrigerant heat rejection heat exchanger, an expansion device, and a refrigerant heat absorption heat exchanger connected in refrigerant flow communication in a close loop refrigerant circuit and arranged in a conventional refrigeration cycle. The refrigerant compression device 32 may be a single-stage or multiple-stage compressor such as, for example, a reciprocating compressor or a scroll compressor. The transportation refrigeration unit 22 can also include one or more fans associated with the refrigerant heat rejection heat exchanger and can be driven by fan motor(s) and one or more fans associated with the refrigerant heat absorption heat exchanger and driven by fan motor(s). The transportation refrigeration unit 22 may also include a heater associated with the refrigerant heat absorption heat exchanger. It is to be understood that other components may be incorporated into the refrigerant circuit as desired, including for example, but not limited to, a suction modulation valve, a receiver, a filter/dryer, an economizer circuit. Those of skill in the art will understand the conventional components and functionality provided by the refrigeration unit 22 to circuit airflow into the refrigerated cargo space 119 and as such they will not be shown or described in detail herein. It will be understood that although FIGS. 2 and 5 show a transportation refrigeration unit 22 having a compressor 32, condenser, evaporator and fans, this depiction is merely illustrative and that the transportation unit 22 shown in these figures may include less or more of the other device and elements described herein.

The transportation refrigeration unit 22 can be powered by the energy storage device 24, which provides electrical power to the transportation refrigeration unit 22 during operation of the transport refrigeration system 200. Examples of the energy storage device 24 may include a battery system (e.g., a battery or bank of batteries), fuel cells, flow battery, and others devices capable of storing and outputting electric energy that may be direct current (DC). The energy storage device 24 may include a battery system, which may employ multiple batteries organized into battery banks. The energy storage device 24 can be interchangeable with another energy storage device. For example, in some embodiments, any battery with voltage from 300V to 700V can be interchangeably used as the energy storage device 24 to drive a 480V compressor.

According to some embodiments, the battery 24 may be charged by a stationary charging station (not shown) such as, for example a wall power outlet, or some other outlet connected to a power grid. The charging station may provide single phase (e.g., level 2 charging capability) or three phase AC power to the energy storage device 24. It is understood that the charging station may have any phase charging and embodiments disclosed herein are not limited to single phase or three phase AC power. In an embodiment, the charging station may provide a high voltage DC power, such as, for example, 500 VDC.

In one embodiment, the energy storage device 24 is located outside of the transportation refrigeration unit 22, as shown in FIG. 1. In another embodiment, the energy storage device 24 is located within the transportation refrigeration unit 22. The transportation refrigeration unit 22 can have a plurality of electrical power demand loads on the energy storage device 24, including, but not limited to, a motor for compressor 32, a drive motor for a fan associated with a refrigerant heat rejection heat exchanger, a drive motor for a fan associated with a refrigerant heat absorption heat exchanger, or any other such aspects of the transportation refrigeration unit 22 that may require electrical power.

The various devices of the transport refrigeration unit 22 (e.g., refrigerant compression device 32, condenser, evaporate, fan(s), etc.) are typically powered by alternating current (AC) motors, whereas the power supplied by the energy storage device 24 is a DC voltage. Therefore, a power conversion unit 26 is electrically connected between the energy storage device 24 and the transport refrigeration unit 22 to convert electrical power supplied from the energy storage device 24 to the refrigerant compression device 32 from DC to AC.

According to some embodiments, as shown in FIG. 2, the power conversion unit 26 can include an inductor 210, a boost stage 220 and an inverter 230. The inductor 210 has input terminals that connect in series to an output terminal of the energy storage device 24 and output terminals that connect to input terminals of the boost stage 220. According to some embodiments, the inductor 210 has the same number of outputs as there are phases in the boost stage 220. Thus, as shown in FIG. 2, the inductor 210 has two outputs, each of which connect to one of two input terminals of the two phases of the boost stage 220. The outputs of the boost stage 220 are connected in parallel with inputs of the inverter 230 as well as a second terminal of the energy storage device 24 and a DC capacitor 240. The outputs of the inverter 230 are connected in series with the inputs of the transportation refrigeration unit 22.

Figure 3:
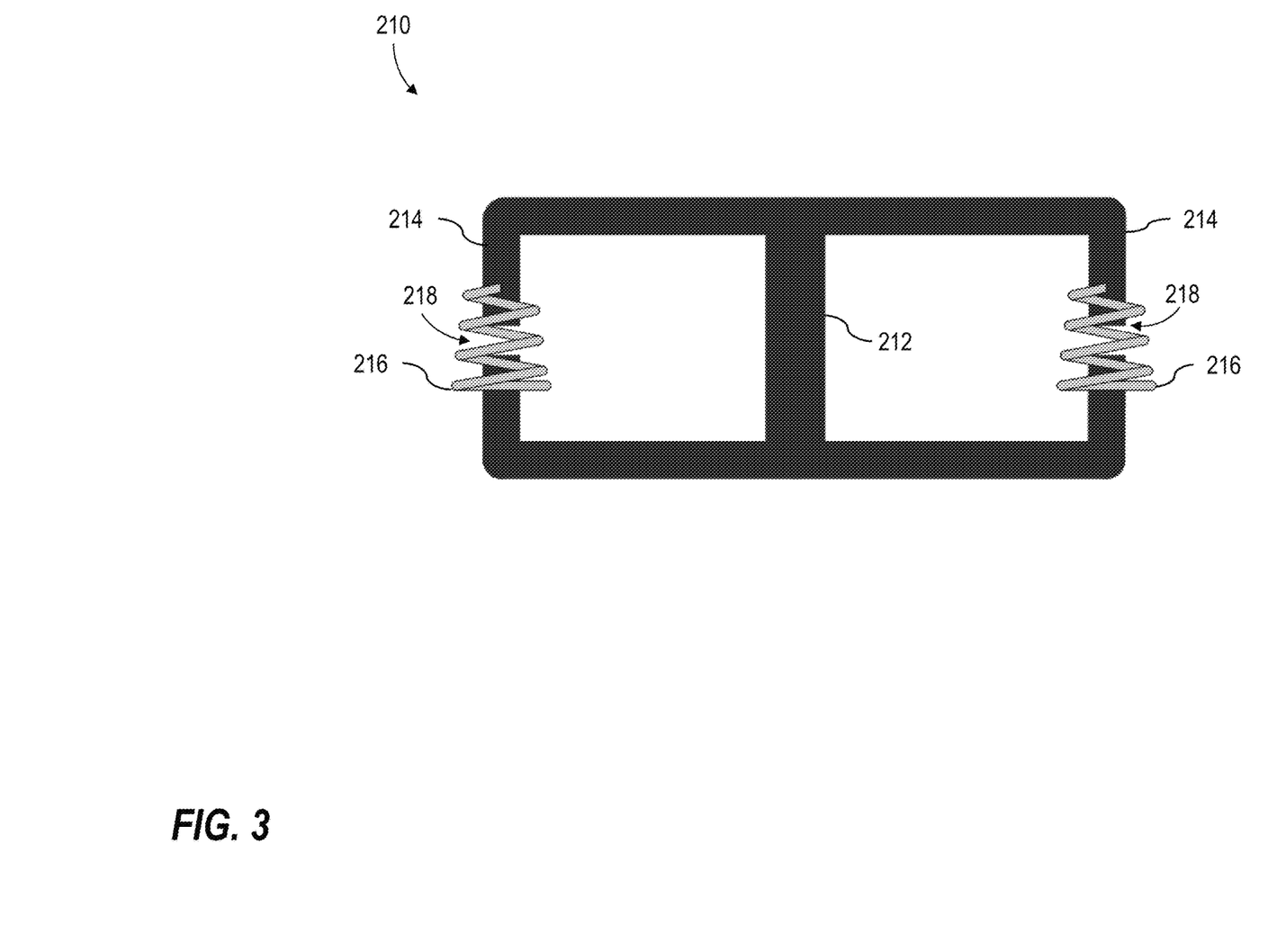
FIG. 3 is a schematic illustration of an inductor used in the power conversion unit of FIG. 2, according to an embodiment of the present disclosure.

FIG. 3 shows an enlarged view of the inductor 210 of FIG. 2. As will be appreciated by those of skill in the art, in general an inductor can store energy in a magnetic field when electric current flows through it. As shown, the inductor 210 has a core that includes one internal leg 212 and two external legs 214. According to some embodiments, there is a coil 216 disposed around each external leg 214. One end of each coil 216 is connected in series to a respective input of a phase of the boost stage 220. Further, each external leg 214 has an air gap 218 in the leg that is spanned by the coil 216. The internal leg 212 does not have an air gap. As will be appreciated by those of skill in the art, the air gaps 218 present in the external legs 214 act to decouple the legs of the inductor such that flux generated by one coil 216/external leg 214 will not pass to another coil 216/external leg 214. This allows each external leg 214/coil 216 pair to be magnetically isolated from the other external legs 214, which allows each coil 216 to separately store energy in its respective magnetic field in response to receiving current from the energy storage device 24 and independently dispense that energy (i.e., via providing a current) to a respective connected phase of the boost stage 220. In other words, each coil 216 can store and dispense energy (i.e., electric current) to a respective phase of the boost stage 220 independent of the other coils 216. In this way, embodiments of the inductor 210 disclosed herein, is a non-coupled structure with multiple coils, can operate in a manner that would conventionally be achieved using multiple different inductor devices, which takes up a much greater amount of physical space. Thus, embodiments of the disclosed inductor 210 design can provide current to a multiphase boost stage in an interleaved fashion to achieve the desired voltage conversion, but can do so with a reduced footprint that allows for a more compact design to save physical space. The non-coupled (or weakly coupled) structure allows for independent phase current shaping. The non-coupled (or weakly coupled) structure may have a coupling coefficient of less than 0.05. Otherwise, with closely coupled inductor structure, the peak current at each phase will be significantly higher in some operating conditions, which causes much higher loss for both the inductor 210 and the semiconductor devices in boost stage 220.

Figure 4:
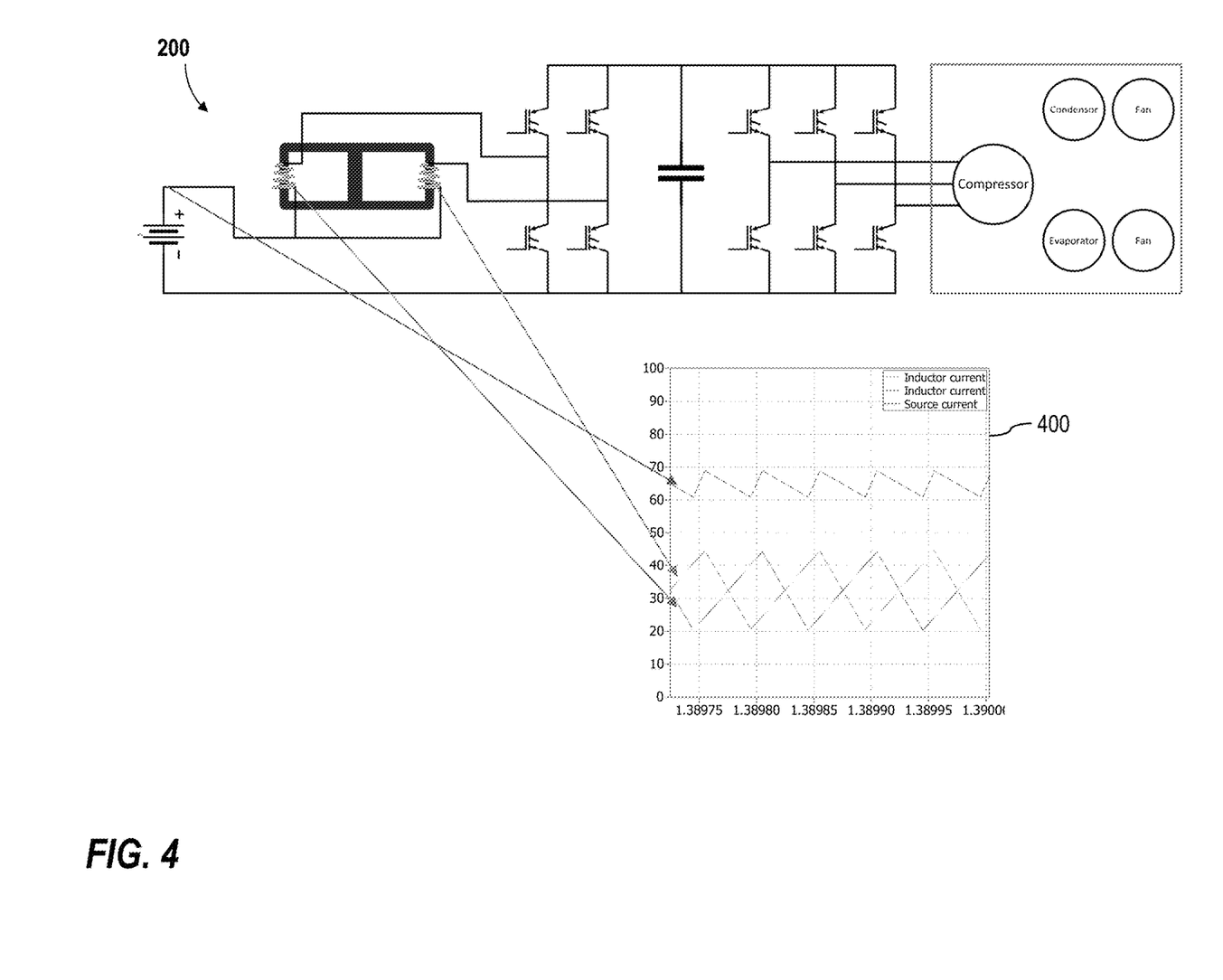
FIG. 4 is a timing diagram of a source current and inductor currents of the power conversion unit of FIG. 2, according to an embodiment of the present disclosure.

FIG. 4 shows an example waveform 400 of the source current flowing from the energy storage device 24 and the resulting inductor current at each of the two coils 216. As will be appreciated, the inductor currents of each of the two coils 216 have identical waveforms but are offset in time. This offset in time between the two inductor currents is caused by the delay in switching time of power devices between phases of the boost stage 220. For example, when the low side device of the first phase of the boost stage 220 is on and high side device of first phase of boost stage 220 is off, the current in the first coil 216 of the inductor 210 increases. At the same time, the high side device of the second phase of boost stage 220 is on and the low side device of the second phase of boost stage 220 is off, the current in the second coil 216 of the inductor 210 decreases. After certain period, the operating condition of two phases changes, causing the current in the first coil 216 of the inductor 210 decreases and the current in the second coil 216 of the inductor 210 increases. This increasing and decreasing period in current contributes to the current ripple in each inductor. As can be seen in the waveform 400, the ripple current at the energy storage device 24 is reduced due to the interleaving of the inductor currents.

According to some embodiments, each phase of a multiphase boost stage can be a half-bridge circuit for performing DC-to-DC power conversion to increase the voltage of the input signal. As shown in FIG. 2, a two phase boost stage 220 can include four transistors, where each phase includes a pair of transistors connected to an output terminal of an external leg 214 of the inductor 210. The output voltage is controlled by the duty cycle of the power devices, where the duty cycle is defined as the ratio of ON time of the low side device to the switching period. Also it is noted that the high side and low side device will be on and off alternatively. For the interleaving operation, all the phases have the same duty cycle, while the control signal is delayed by certain time to each other. As will be appreciated by those of skill in the art, the power devices of the boost stage 220 can be selectively controlled by a controller (not shown) to boost a DC voltage provided by the energy storage device 24. In some embodiments, each of the phases can be selectively controlled by a controller to modify a DC voltage provided from the energy storage device 24 to selectively deliver one of a predetermined plurality of output DC voltages to the inverter 230. In other words, components of the transportation refrigeration unit 22 may operate on a higher voltage than is provided by the energy storage device 24 and the boost stage 220 acts to increase this voltage by controlling the duty cycle of the power devices. The boost stage 220 operates in conjunction with the inductor 210 to boost the voltage of the energy storage device 24. The ratio between output voltage and input voltage is 1/(1-D), where D is the duty cycle of low side switch. Each phase of the boost stage 220 outputs the same voltage by having the same duty cycle while with gate signals that are interleaved with other phases. For example, in a two phase boost stage 220 as shown in FIG. 2, each phase produces a signal with a 50% duty cycle that is offset by 180 degree from the other signal to create an interleaving voltage output (e.g., interleaved in a manner similar to the inductor currents shown in FIG. 4).

According to some embodiments, the DC link 240 be a capacitor. The DC link can act to smooth out the interleaved signal output by the boost stage 220 in order to create a constant DC signal. As will be appreciated, the inverter 230 can act to convert the boosted DC voltage into a three phase AC voltage to power elements of the transportation refrigeration unit 22 (e.g., refrigerant compression device 32 or other loads).

It should be understood that the foregoing example of a two phase boost stage 220 is not intended to be limiting, and that many different embodiments with different numbers of phases are contemplated herein. Generally speaking, a boost stage can be a multiphase boost stage with any number of phases and the inductor 210 can be a multiphase inductor with any corresponding number of legs/coils. For example, a three phase inductor can have three exterior legs with air gaps and coils that are each connected to one of three phases of a boost stage. Thus, a multiphase inductor will have a number of coils greater than one. It is contemplated that in some embodiments, an inductor may have more external legs than phases. For example, a multiphase inductor having four external legs can be used as a three phase inductor by only providing air gaps and coils on three of the four external legs. In some instances, the fourth external leg may have an air gap but no coil and the inductor can be used as a three phase inductor. Each phase of a boost stage will correspond to a coil and air gap of the inductor. Thus, the number of coils, air gaps and phases of the boost stage will generally be equal. Another example of a multiphase boost stage and multiphase inductor is shown in FIG. 5.

Figure 6:
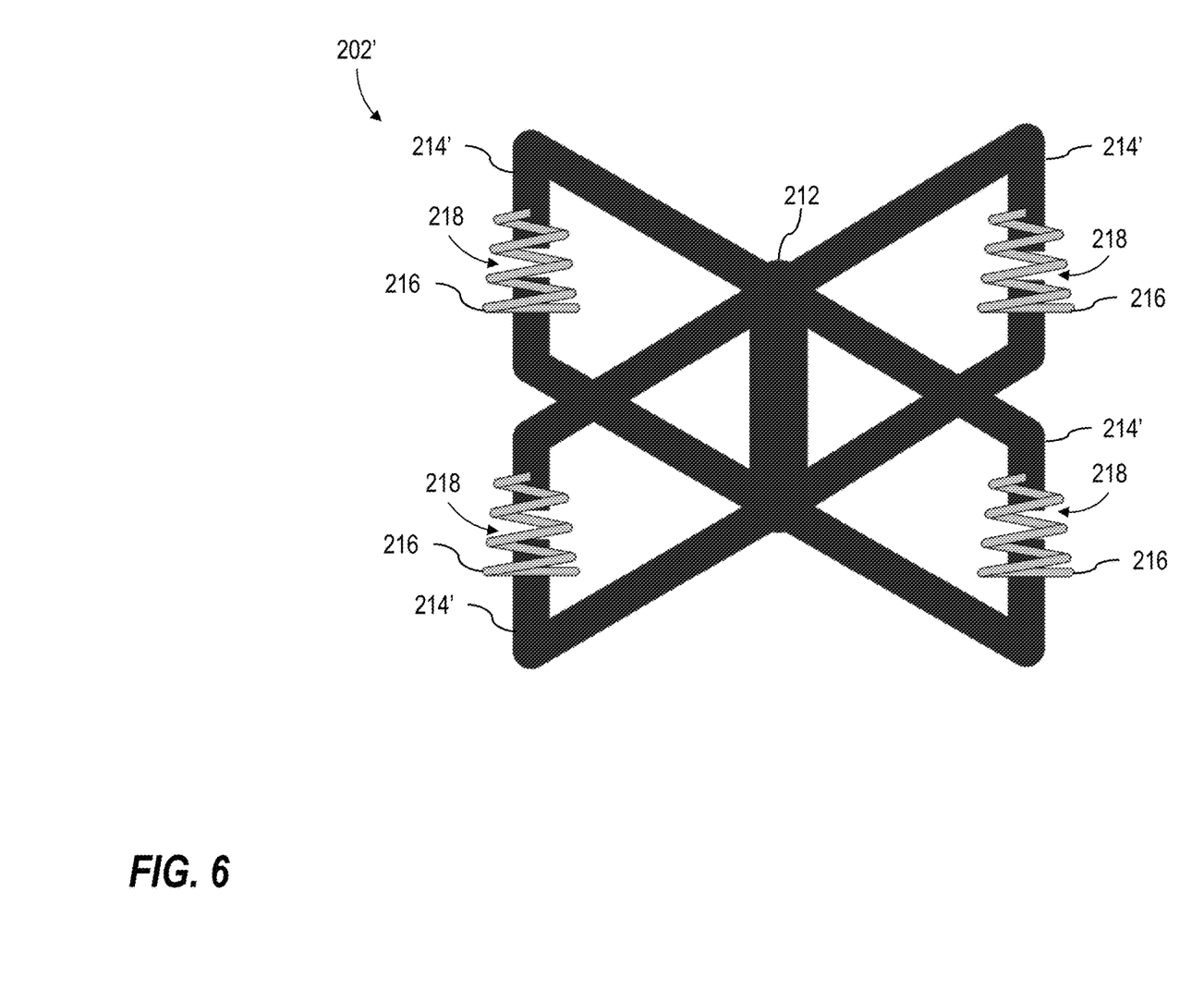
FIG. 6 is a schematic illustration of an inductor used in the power conversion unit of FIG. 5, according to an embodiment of the present disclosure.
Figure 7:
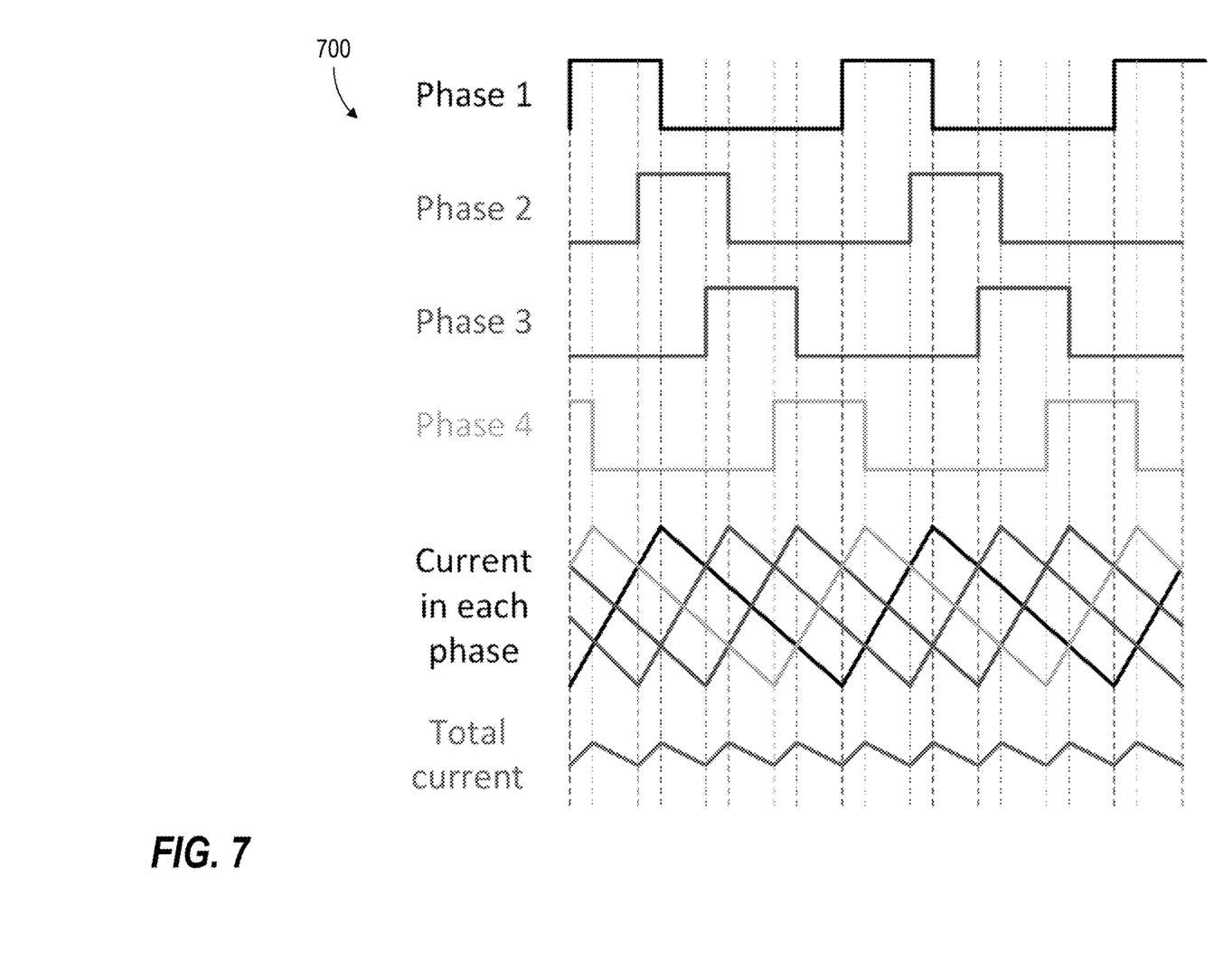
FIG. 7 is the typical gate signals of power devices that drive this interleaving operation of multiphase boost stage of the power conversion unit of FIG. 5 and the corresponding current in each phase and total current, according to an embodiment of the present disclosure.

FIG. 5 depicts an example embodiment of a transport refrigeration system 200' having a power conversion unit 26' that has four phase boost stage 220'. As shown, each of the four phases of the boost stage 220' has a pair of power devices that operates in a manner similar to that of the phases of the boost stage 220 described above with respect to FIG. 2. Similarly, FIG. 6 shows an enlarged view of the multiphase inductor 202' of FIG. 5. In this case, the multiphase inductor 202' has four external legs 214', each having a coil 216 and an air gap 218. The coil 218 in each external leg 214' is connected to an input of a respective phase of the four phase boost stage 220'. The four phase boost stage 220' will operate in a similar manner to the boost stage 220 of FIG. 2, however because there are four phases, each phase will be offset from the next phase by approximately 90 degrees, as shown in the timing diagram 700 depicted in FIG. 7. In other words, the gate signal of each phase is delayed by ¼ of the switching period to each other. However, as shown in FIG. 7, there may be some overlap between the phases when there is more than two phases. Similar to what is shown in FIG. 4, the use of multiple phases also improves current ripple. The timing diagram 700 shows that the inductor current for each phase of the four phase design has a very high ripple, but the total ripple at the energy storage device 24 is relatively low. Generally speaking, the more phases that are used, the more of a reduction in current ripple can be achieved because the current ripple are cancelled out at a higher equivalent frequency.

As described above, embodiments can be in the form of processor-implemented processes and devices for practicing those processes, such as processor. Embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A voltage conversion system operable to couple to an energy storage device and a load, the voltage conversion system comprising:
    an inductor, the inductor comprising at least one internal leg, a first external leg and a second external leg;
    wherein first external leg comprises an upper first external leg region separated from a lower first external leg region by a first air gap;
    wherein second external leg comprise an upper second external leg region separated from a lower second external leg region by a second air gap;
    wherein the at least one internal leg does not include an air gap;
    the inductor further comprising a number of coils around the first external leg and the second external leg, wherein the number of coils are non-coupled or weakly coupled, with a coupling coefficient less than 0.05;
    a multi-phase boost stage coupled to the inductor, wherein the multiphase boost stage comprises a number of phases that equals the number of coils; and
    an inverter coupled to the multiphase boost stage.

2. The voltage conversion system of claim 1, wherein the number of coils is greater than 1.

3. The voltage conversion system of claim 2, wherein no coils are disposed on the at least one internal leg.

4. The voltage conversion system of claim 3, wherein each of the number of coils is operable to connect to a first terminal of the energy storage device, wherein each of the number of coils is connected to a respective input terminal of one of the number of phases of the multiphase boost stage.

5. The voltage conversion system of claim 4, wherein:
    a source current from the energy storage device results in a first inductor current at the first external leg and a second inductor current at the second external conductor leg;
    each of the number of phases of the multiphase boost stage are configured to control the first inductor current and the second inductor current in an interleaved manner such that:
        the first inductor current and the second inductor current are offset in time;
        the first inductor current increases while the second inductor current decreases; and
        the first inductor current decreases while the second inductor current increases; and
    the interleaved control of first inductor current and the second inductor current reduce a ripple of the source current from the energy storage device.

6. The voltage conversion system of claim 3, wherein the first air gap and the second air gap are configured to provide an inductance at the first external leg and the second external leg.

7. The voltage conversion system of claim 1, wherein each of the number of phases of the multiphase boost stage comprises a half-bridge circuit for performing DC-to-DC power conversion.

8. The voltage conversion system of claim 7, wherein each of the number of phases of the multiphase boost stage are configured to be controlled in an interleaved fashion by a controller to modify a DC voltage provided from the energy storage device to selectively deliver a preferred output DC voltages to the inverter.

9. The voltage conversion system of claim 1, wherein the inverter is configured to perform DC-to-AC power conversion to provide an AC power to the load.

10. A transport refrigeration system comprising:
a controller;
an energy storage device;
a power conversion unit connected to the energy storage device, the power conversion unit comprising:
an inductor, the inductor comprising at least one internal leg, a first external leg and a second external leg;
wherein first external leg comprises an upper first external leg region separated from a lower first external leg region by a first air gap;
wherein second external leg comprise an upper second external leg region separated from a lower second external leg region by a second air gap;
wherein the at least one internal leg does not include an air gap;
the inductor further comprising a number of coils around the first external leg and the second external leg, wherein the number of coils are non-coupled or weakly coupled, with a coupling coefficient less than 0.05;
a multiphase boost stage coupled to the inductor, wherein the multi-phase boost stage comprises a number of phases that equals the number of coils;
an inverter coupled to the multiphase boost stage; and
a transportation refrigeration unit coupled to the power conversion unit.

11. The transport refrigeration system of claim 10, wherein the number of coils is greater than 1.

12. The transport refrigeration system of claim 11, wherein no coils are disposed on the at least one internal leg.

13. The transport refrigeration system of claim 12, wherein each of the number of coils is operable to connect to a first terminal of the energy storage device, wherein each of the number of coils is connected to a respective input terminal of one of the number of phases of the multiphase boost stage.

14. The transport refrigeration system of claim 13, wherein:
a source current from the energy storage device results in a first inductor current at the first external leg and a second inductor current at the second external conductor leg;
each of the number of phases of the multiphase boost stage are configured to control the first inductor current and the second inductor current in an interleaved manner such that:
the first inductor current and the second inductor current are offset in time;
the first inductor current increases while the second inductor current decreases; and
the first inductor current decreases while the second inductor current increases; and
the interleaved control of first inductor current and the second inductor current reduce a ripple of the source current from the energy storage device.

15. The transport refrigeration system of claim 12, wherein the first air gap and the second air gap are configured to provide an inductance at the first external leg and the second external leg.

16. The transport refrigeration system of claim 10, wherein each of the number of phases of the multiphase boost stage comprises a half-bridge circuit for performing DC-to-DC power conversion.

17. The transport refrigeration system of claim 16, wherein each of the number of phases of the multiphase boost stage are configured to be controlled in an interleaved fashion by a controller to modify a DC voltage provided from the energy storage device to selectively deliver a preferred output DC voltages to the inverter.

18. The transport refrigeration system of claim 10, wherein the inverter is configured to perform DC-to-AC power conversion to provide an AC power to the transportation refrigeration unit.

* * * * *